United States Patent [19]

Custer

[11] Patent Number: 5,522,921
[45] Date of Patent: Jun. 4, 1996

[54] INVISIBLE, X-RAY OPAQUE FLUORESCENT PRINTING MEDIUM FOR MULTIPLEX READING

[76] Inventor: Peter Custer, 19 Bianco Court, Providence, R.I. 02909

[21] Appl. No.: 320,227

[22] Filed: Oct. 11, 1994

Related U.S. Application Data

[63] Continuation of Ser. No. 965,777, Oct. 23, 1992, abandoned.

[51] Int. Cl.$^6$ ................................................... C09D 11/00
[52] U.S. Cl. ..................... 106/21 R; 106/21 A; 106/479; 252/301.28
[58] Field of Search ............................... 106/21 R, 21 A, 106/479; 378/162; 430/933; 252/301.28

[56] References Cited

U.S. PATENT DOCUMENTS

| | | | |
|---|---|---|---|
| 2,462,018 | 2/1949 | Wood | 250/108 |
| 4,813,062 | 3/1989 | Gilpatrick | 378/162 |
| 4,918,715 | 4/1990 | Krupnick et al. | 378/164 |

*Primary Examiner*—Helene Klemanski
*Attorney, Agent, or Firm*—Banner & Allegretti, Ltd.

[57] ABSTRACT

Materials for printing information that are invisible under normal white or visible light but are x-ray opaque and ultraviolet fluorescent or absorbent are used for multiplex reading. The invention permits a reader to use x-ray radiation, ultraviolet light or visible light to read printed information. With the x-ray reading capability it is possible to read pages in sealed envelopes, thick documents or unopened attache cases.

11 Claims, No Drawings

INVISIBLE, X-RAY OPAQUE FLUORESCENT PRINTING MEDIUM FOR MULTIPLEX READING

This application is a continuation of U.S. patent application Ser. No. 07/965,777, filed Oct. 23, 1992, now abandoned.

FIELD OF THE INVENTION

The invention relates to materials and processes for printing information that is readable in multiplex fashion. More specifically, the invention provides printed information, a portion of which is readable with x-ray radiation and another portion may be readable with ultraviolet light, but no portion is readable with visible light. Printed information pursuant to the invention may be either in the form of ultraviolet light stimulated fluorescent material or ultraviolet light absorbing material.

BACKGROUND OF THE INVENTION

Though several readers may need to obtain information from the same document, it is not always necessary for every reader to read all information printed on a document. As an example, many retail businesses send mass mailings to customers. These mass mailings can contain advertising and offer information that needs to be readily read. When customers return mailings with acceptances or in part, rejections of offers, the returned mailings need to be sorted before responses can be made to acceptances and partial rejections. For example, sortings can be made according to: (i) geographic location of addressee, e.g., by zip code; and (ii) whether there is acceptance or partial rejection of offers. Because of the large volume of mail that can be involved, such sorting needs to be automated. Pragmatically, this necessity for automation should be effected, if at all possible, without imposing an impersonal appearance to mailings that could unfavorably prejudice readers. As an example, impersonal appearance unavoidably arises when printed material includes bar codes and other printings not intended for the addressee. Achieving this goal of not including visible printed material required by the sender but not the addressee and also the goal of keeping simple procedures for responding to mailings are not always possible if return mail handling is to be automated.

A capability to read documents inside sealed envelopes would further expedite mail processing. Such expedition has heretofore been attempted by the use of differently colored or marked envelopes to be selected by addressees to indicate their response. This procedure violates both the goal for making mailing appear personal, i.e., returned mail will be personally handled, and also the goal of keeping mailings simple so addressees can understand and respond in a minimum amount of time with a minimum amount of effort.

The guarding of document security occasions additional problems. In particular, if more than an honor system is to be used, the task of assuring document security has heretofore required that all documents taken from secured areas must be quickly and accurately processed at check points, such as building or facility exits, to detect documents taken without authorization. Multipaged documents and also documents in envelopes or attache cases must be inspected quickly and hence without opening envelopes or attache cases.

Previously, to facilitate such inspections, every page containing sensitive information was either stamped or printed with a heading in bold bright lettering identifying the page as containing sensitive information to be kept secret and not disclosed. If a page with such a heading is in plain sight, there is no difficulty in identifying it as not being available for public disclosure. On the other hand, such headings are of very limited to no use when the marked pages are included with unmarked pages in thick documents, or the marked pages are in sealed envelopes or closed attache cases.

An associated situation to using a marked heading on documents containing confidential information arises when markings such as watermarks are used on valuable documents not to be counterfeited or copied in any fashion for use as an original. Again, the same disability to read marks when documents are covered and not visible arises. Further, accurate and fast readings of watermarks and the like which are not readily visible even when a document is in plain view are frustrated.

SUMMARY OF THE INVENTION

The capability to print information usable for multiple reading which is not readable with visible light would overcome some of the aforementioned obstacles which attend the identification of documents. This invention, however, does not merely provide printed information readable by an invisible source such as ultraviolet or infrared light. An unavoidable limitation is the requirement that each sheet must be exposed for reading. The present invention avoids that limitation by providing x-ray readable printed material that is not visible when exposed by normal white light. Pursuant to the invention, information printed for reading with x-ray radiation is legible even though the printed page is included within a thick document, sealed in an unopened envelope, or contained in an unopened attache case. To facilitate reading printed pages that do not have to be remotely read, the present invention uses additional print material besides x-ray readable material. This additional print material is also fixed to paper and is invisible under normal white light used for reading.

One embodiment of the present invention comprises a medium for printing which contains a triaryl bismuth compound, preferably triphenyl bismuth which is both x-ray opaque and invisible when exposed to white light. X-ray radiation passed through materials, including a page imprinted with a triaryl bismuth medium, is blocked. A shadow pattern results that can be readily read irrespective of whether the printed page is in direct or remote view. Such printing for x-ray reading is essential for reading of remote documents.

When documents are available for direct reading, the equipment required for x-ray reading can be avoided by the present invention with print materials that are still invisible to normal white light used for reading, but are readable with ultraviolet light. In this embodiment of the invention, ultraviolet light can be used to stimulate fluorescence for direct reading without the need for detectors or imaging viewers such as are needed for x-ray or infrared reading. To further facilitate reading, either a fluorescing or ultraviolet absorbing material can be used depending on the type of paper on which information is printed. This flexibility is advantageous because some papers include fluorescing brighteners and therefore ultraviolet absorbers are more effective than fluorescing materials. Thus, the represent invention is not limited by paper type.

BEST MODE FOR CARRYING OUT THE INVENTION

The present invention provides a printing material that can be used in dry form for electrostatic xerographic printing or in liquid form for ink jet or other type printing where liquid ink or toner is applicable. An imprint of the printing material or medium is made on a surface, such as envelopes, as discussed later. The printing material of the invention includes a substance which, after printing, is invisible when viewed under normal visible or white light but is opaque to x-rays. Additionally, the printing material may contain a second printing substance that after printing is also invisible when viewed under normal visible or white light, but is either fluorescent after exposure to ultraviolet light or absorbs ultraviolet light. The printing material also contains a carrier for the x-ray opaque substance.

There are multiple candidates for x-ray opaque substances for printing material of the present invention, but not all concurrently satisfy all requirements. For example, barium sulfate ($BaSO_4$) is a well known x-ray opaque substance used in many applications where its x-ray opacity is required to include medical diagnosis of the alimentary canal in humans. However, barium sulfate ($BaSO_4$), when used in printing material, is visible after printing and is therefore unacceptable. The invisible printing provided by the present invention is an important advantage because readers beyond the intended audience are not distracted or misinformed by seeing information not intended for their consideration.

Printing for multiplex reading requires that readers be able to clearly read information with visible light, x-ray radiation, or ultraviolet light, depending on circumstances without being confused by information printed for reading under a different type of illumination.

It has been found that triaryl bismuth compounds, in particular triphenyl bismuth, are acceptable x-ray opaque substances for use with the present invention. Triphenyl bismuth, for example, is clear, colorless and dissolves or disperses in polymers. It is resistant to moisture, is stable when heated and has a toxicity index comparable with that of bismuth free materials even when contained in resin mixtures. It is an ideal x-ray opaque material for the present invention.

Triphenyl bismuth is an important known material that has been used for radiopaque (x-ray contrast) applications such as an additive for plastics in dentistry, or in medical devices such as implants, sutures and catheters. Implant plastics containing triphenyl bismuth permit use of radiography as a rapid and nondestructive method for detection and analysis. These applications demonstrate the effectiveness and safety of triphenyl bismuth as a radiography material even for medical applications. Another effective application of triphenyl bismuth is as an additive for plastic components used in firearms. Here its x-ray opaque capabilities can be relied on to assure that covert firearms are not sold to the public.

Triphenyl bismuth has the additional convenient property of a 78° C. melting point which is higher than ambient but low enough to permit heated stamp printing. This capability for heated stamp printing adds to the list of most other printing methods where triphenyl bismuth can be used. Among the other methods are ink jet or other techniques such as ELECTROBOOK press printing recently introduced by AM International, McGraw-Hill and R. R. Donnelley. Triphenyl bismuth can be dissolved in toluene or used as a dry toner for electrostatic xerographic writing. Xerographic writing or printing can provide a printed layer containing triphenyl bismuth having a thickness of at least about 10 µM.

A solenoid may be used to impact a heated stamp which strikes a heat-resistant plastic ribbon with a triphenyl bismuth coating on the opposite side. With a 78° C. melting point, the triphenyl bismuth can be printed with essentially 100 percent accuracy in a fast, safe and accurate fashion. This method of printing also facilitates assuring that the print stack height for triphenyl bismuth be between 10 to 30 µM as required for providing effective x-ray opacity. In contrast, assuring sufficient print stack height can be a potential limitation of ink jet printing. However, when print stack heights of 10 to 30 µM are achieved, effective x-ray reading is possible.

Combining heated stamp printing with envelope filling is an example of a particularly effective use of the present invention. Here each piece of paper put in an envelope can be imprinted with a triphenyl bismuth mark or pattern. Where security is of concern, a random number generator can be used to singly or multiply stamp each sheet. Each envelope prior to mailing but after sealing can be x-ray scanned to assure that the proper documents are enclosed and even that the documents are correctly oriented.

Many configurations of x-ray sources and detectors or views for reading documents in sealed envelopes can be used. Though only ray dose levels are required for reading, safety can be further assured by having the x-ray reading device enclosed in a x-ray shield made of material such as lead. Inside the x-ray reading device is a source of x-rays. The x-ray source can be arranged for large area illumination or scanning. Scanning facilitates reading of bar codes. Also enclosed in the x-ray reading device is a x-ray viewer or detector. Each envelope is passed between the x-ray source and x-ray detector using conveyor feed belts. This arrangement permits low cost assembly and high accuracy reading to assure every envelope contains the proper documents even though each envelope may have been machine filled.

Not all documents printed for multiplex reading must be remotely read, e.g., inside sealed envelopes, thick documents or in unopened attache cases. For such documents x-ray reading equipment is not required. If is nevertheless an advantage of the present invention that information for multiplex reading is provided even though x-ray reading is not used. For that purpose, the invention provides printing which is not visible under normal white light. For that purpose ultraviolet absorbent or fluorescent material is utilized. The provision of capability for using ultraviolet absorbent or fluorescent printing material is necessary because some papers include fluorescent additives as brighteners. Fluorescent printing information on such papers could result in low contrast or signal to noise ratio which would render correct reading of the imprinted material difficult. To overcome this problem, ultraviolet absorbent material is used with the present invention to enhance contrast or signal to noise ratio and therefore facilitate reading.

One example of an ultraviolet fluorescent material usable with the present invention is 2,2'-(2,5-thiophenediyl)bis[5-tert-butylbenzoxazole]. This material is sold by Ciba-Geigy Corporation under the federally registered name Uvitex® OB. As with triphenyl bismuth, Uvitex® OB is invisible when printed on paper and exposed to normal white light. However, when exposed to ultraviolet light, it fluoresces and in particular its peak fluorescence arises about 430 nm.

An example of an ultraviolet absorbent material usable with the present invention is an isomer mixture from the alkylation of 2-(2-hydroxy-5-methylphenyl)-benzotriazole with 1-dodecene. This material is sold by Ciba Geigy Corporation under the federally registered name Tinuvin®

171. As with triphenyl bismuth, Tinuvin® 171 is invisible when printed on paper and exposed to normal white light. However, when exposed to ultraviolet light, it absorbs substantial radiation in the band from 300 to 400 nm which provides a high contrast or signal to noise ratio for easy reading on paper with ultraviolet brighteners.

Preferably, substantially saturated solutions of aryl bismuth compounds and an aryl hydrocarbon solvent are used. Useful solutions of triphenyl bismuth in toluene are about 50% to about 90% saturated. In the compositions aforementioned, ultraviolet fluorescent or absorption agents may be added in an amount sufficient to provide the necessary result. For example, about 5 parts to about 10 parts by weight of such agents may be included.

Triphenyl bismuth may be replaced by other aryl bismuth compounds, such as a monophenyl bismuth, a meta or para diphenyl bismuth, or mono, di, or trinaphyl bismuth. The aromatic rings of the triaryl bismuth compounds useful in the invention may be substituted, for example, by alkyl groups having 1 to 10 or more carbon atoms. Toluene may be replaced by other hydrocarbon solvents such as xylene and benzene.

The above discussion and related illustrations of the present invention are directed primarily to preferred embodiments and practices. However, it is believed numerous changes and modifications in actual implementation of described concepts will be apparent to those skilled in the art, and it is contemplated that such changes and modifications may be made without departing from the scope of the invention as defined by the following claims.

I claim:

1. A printing medium for multiplex reading consisting of a white light invisible and colorless x-ray opaque medium selected from the group consisting of monophenyl bismuth, diphenyl bismuth, triphenyl bismuth, mononapthyl bismuth, dinaphthyl bismuth, trinaphthyl bismuth, and alkyl substituted compounds thereof, a fluorescent dye invisible in white light, and a carrier.

2. In a method for electrostatic printing, the improvement which comprises printing with a printing medium as defined by claim 1.

3. A method as defined by claim 2 wherein said electrostatic printing provides a printed layer containing triphenyl bismuth having a thickness of at least about 10 μM.

4. A method as defined by claim 2 wherein said printing medium comprises an ultraviolet light absorbent material.

5. A method as defined by claim 2 wherein said printing medium comprises 2,2'-(2,5-thiophenediyl)bis[5-tert-butyl-benzoxazole].

6. A printing medium in accordance with claim 1 wherein the x-ray opaque medium contains triphenyl bismuth.

7. The printing medium of claim 1 wherein the fluorescent dye is 2,2'-(2,5-thiophenediyl)bis[5-tert-butylbenzoxazole].

8. A printing medium for multiplex reading for application to papers which include a fluorescent optical brightener said medium comprising a white light invisible and colorless x-ray opaque material, an ultraviolet absorbent material which is invisible in white light and a carrier.

9. The printing medium for multiplex reading of claim 8 wherein the white light invisible and colorless x-ray opaque medium is selected from the group consisting of monophenyl bismuth, diphenyl bismuth, triphenyl bismuth, mononapthyl bismuth, dinapthyl bismuth, trinapthyl bismuth, and alkyl substituted compounds thereof.

10. The printing medium according to claim 9 wherein the ultraviolet absorbent material is an isomer mixture from the alkylation of (2-hydroxy-5-methyl-phenyl)-benzotriazole with 1-dodecene.

11. A surface bearing an imprint in the printing medium defined by claim 9.

* * * * *